July 18, 1961 K. D. BROADBENT 2,993,197

MAGNETIC DEVICE

Filed Aug. 2, 1957 3 Sheets-Sheet 1

Kent D. Broadbent,
*INVENTOR.*

Edward J. Da Rin

*AGENT.*

July 18, 1961 K. D. BROADBENT 2,993,197

MAGNETIC DEVICE

Filed Aug. 2, 1957 3 Sheets-Sheet 2

Kent D. Broadbent,
INVENTOR.

Edward J. DaKin
AGENT.

Kent D. Broadbent,
*INVENTOR.*

*AGENT.*

United States Patent Office 2,993,197

Patented July 18, 1961

2,993,197
MAGNETIC DEVICE

Kent D. Broadbent, Los Angeles, Calif., assignor to Hughes Aircraft Company, Culver City, Calif., a corporation of Delaware Filed Aug. 2, 1957, Ser. No. 675,918
4 Claims. (Cl. 340—174)

This invention relates to magnetic devices and more particularly to multipath magnetic elements capable of use as controlling and computing elements and the like and to systems including such magnetic elements.

Magnetic devices employing magnetic cores having a a substantially square hysteresis characteristic have been utilized to a large extent as switching, controlling and computing elements. In all of these applications, toroidal or ring-shaped cores, which have single apertures and unique flux paths, have been used because of their bistable properties. Experimental work on this basic type of magnetic core device has led to the development of novel devices having a plurality of apertures arranged to provide multiple flux paths. Some of these magnetic devices, having multiple apertures, utilize the additional aperture merely for sensing the storage condition of the magnetic core. These latter types of cores are known as non-destructive readout elements and operate in substantially the same mode as the aforementioned toroidal cores. Other multipath magnetic structures are used as gates, coincidence flux memories, and amplifiers. All of these multiple flux path devices afford a more advantageous and a different degree of control over the signals stored in the magnetic device and which control is not possible with the aforementioned toroidal type cores.

Magnetic shift registers have been developed employing the conventional unique flux path magnetic structures. These conventional magnetic shift registers, however, require unilateral impedance devices, such as diodes, in their transfer loops to maintain the forward flow of information without any back flow thereof. The diode is known to be the most expensive and least reliable element in a magnetic shift register. Therefore, a shift register arrangement eliminating diodes, yet, being capable of operating at high speeds, is in much demand. The aforementioned development of multipath magnetic structures has accelerated this search for diodeless magnetic shift registers. Accordingly, it is desirous to provide a multipath magnetic structure that is capable of use as a control or computer element including shift register operation without resorting to the use of unilateral impedance elements.

It is, therefore, a general object of this invention to provide a novel and improved magnetic element capable of use as a controlling or computing element.

It is another object of this invention to provide a novel and improved magnetic device capable of being employed as a magnetic shift register element, a gating element, or a flip-flop element.

It is still another object of this invention to provide a novel and improved magnetic shift register, without resorting to the use of unilateral impedance devices, that is more reliable, yet less expensive to construct than prior art devices.

It is a further object of this invention to provide a novel and improved high speed, completely magnetic, integral shift register of the character of the aforementioned object that eliminates the back flow of information and limits the forward flow to one storage element.

Further and additional objects and advantages will become apparent hereinafter during the detailed description of the embodiments of the invention which are to follow and, which, are illustrated in the accompanying drawings wherein.

Generally, the invention contemplates the provision of a novel multiple aperture magnetic element having a predetermined geometric configuration so as to define stable multiple flux paths therein. The apertures are interlaced with windings so as to be magnetically coupled in a novel manner to cause the flux generated in the magnetic structure to assume a plurality of essentially closed magnetic configurations. These assumed configurations are stable magnetic conditions within the magnetic element and which conditions are controlled in a unique manner, to not only store binary coded information but also to allow the binary information to be readily transferred therefrom, so as to be capable of providing a controlled unilateral transfer.

Figure 1:
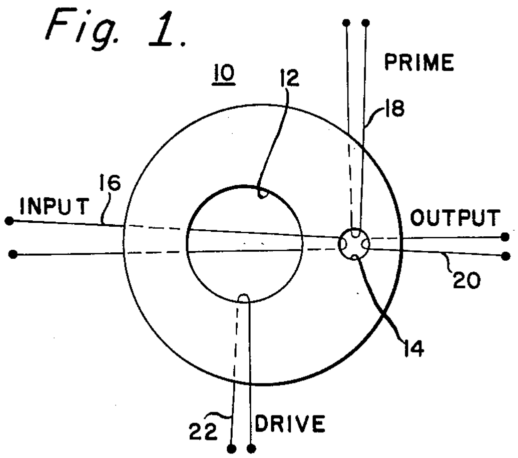
FIG. 1 is a schematic representation of a novel magnetic element embodying the invention.

Now referring to the drawings, the basic arrangement of a novel magnetic element 10 will be described in conjunction with the magnetic element shown in FIG. 1. The magnetic material employed for the magnetic element 10 preferably has a substantially square or rectangular hysteresis characteristic. The magnetic material may be in the form of a conventional toroid or ring, as illustrated in FIG. 1, or may be a thin magnetic film. The latter magnetic form and the preparation thereof is well known in the art as evidenced by the publication of M. S. Blois, Jr., entitled "Preparation of Thin Magnetic Film and their Properties," appearing in the Journal of Applied Physics for August 1955, on pages 975 through 980, published by the American Institute of Physics, 57 East 55th Street, New York, N.Y.

Figure 2:
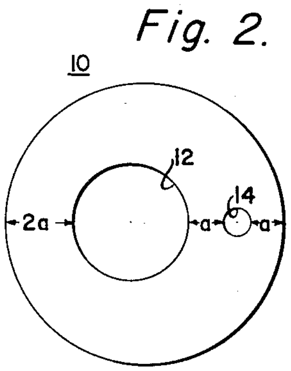
FIG. 2 is a representation of typical geometrical configuration and the relative dimensions of the novel magnetic element of FIG. 1.

A preferable geometric configuration for the magnetic element 10 and the relative dimensions therefor is shown in FIG. 2. The element 10 is shown with a pair of spaced apart circular apertures 12 and 14 having respective diameters on the order of 6:1. The center of the aperture 12 is positioned so that the outer peripheral edge thereof is spaced inwardly from a tangent line to the left-hand edge of the element 10 a distance generally denoted as "$2a$." Also, tangent lines to the top and bottom edges of the element 10 are spaced a distance approximately "$2a$" from the respective edges of the aperture 12. The right-hand peripheral edge of the aperture 12 is spaced inwardly from the right-hand edge of the element 10 a distance of "$2a$" plus the diameter of aperture 14. The spacing between the apertures 12 and 14 is shown as "$a$" with the aperture 14 being spaced inwardly from a tangent line to the right-hand edge of the magnetic element 10 a similar distance "$a$." The same relative dimensions for the apertures 12 and 14 hold for the magnetic element 10 whether the element is in the form of a toroidal core or in terms of a magnetic film.

The multiple flux paths resulting from the aforementioned geometric configuration may be better appreciated by considering the flux paths as passing through discrete legs in the element 10 defined by the apertures 12 and 14. A leg $1^a$ is considered to be defined by the area extending inwardly from the outer peripheral edge, or the left-hand edge of the magnetic element 10 to substantially the center of the distance between this left-hand edge and the adjacent peripheral edge of the aperture 12; see FIG. 3. A leg $1^b$ is similarly defined by the area extending from the right-hand extremity of leg $1^a$ to the peripheral edge of the aperture 12. Magnetic legs are similarly defined by the area between the apertures 12 and 14 and which leg is identified as leg 2 in FIG. 3 while the area between the outer peripheral edge of aperture 14 and the right-hand edge of the magnetic element 10 is denoted as leg 3.

An input winding 16 for the magnetic element 10 is magnetically coupled to the magnetic element 10 for controlling the magnetic condition or state of leg 2. The input winding 16 is magnetically coupled to the element 10 by being interlaced through the aperture 14, as shown in FIG. 1, so as to only control leg 2; that is, the coercive force produced by the energization of winding 16 is effective only in leg 2. A prime winding 18 is also magnetically coupled to the element 10 by means of aperture 14 and is oriented thereon so as to control only the magnetic condition of leg 3. The remaining winding coupled to the magnetic element 10 by being interlaced through the aperture 14 is denoted as the output winding 20. The output winding 20 is interlaced through the aperture 14 so as to have a voltage generated therein only upon a change of flux in leg 3. The remaining winding magnetically coupled to the magnetic element 10 is identified as drive winding 22. Drive winding 22 is interlaced through aperture 12 and arranged thereon to control the magnetic condition of legs $1^a$ and $1^b$. It should be recognized at this point, and will be appreciated more fully from the description to follow, that this drive winding 22 controls legs $1^a$ and $1^b$ to act as both a transfer out and a blocking function. The blocking function of winding 22 does away with the need for a separate block winding to control the saturation of the legs for read-out purposes.

Figure 3:
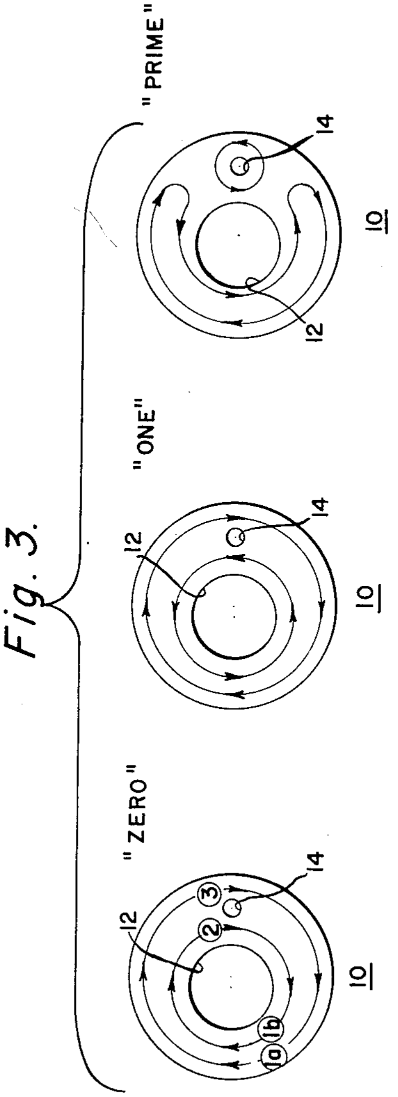
FIG. 3 is a representation of various flux configurations present in the multiple paths of the novel magnetic element shown in FIG. 1 during the various stable conditions thereof.

The flux patterns that represent the various possible stable states that the magnetic element 10 may assume will now be described in conjunction with the illustrations of the stable configurations shown in FIG. 3. Merely for purposes of more clearly explaining the invention, the various stable states will be identified in terms of the well known binary notation as the magnetic element 10 would be employed in a digital computer. Accordingly, the stable states are shown and identified in FIG. 3, reading from left to right, as the "zero," the "one," and the "prime" states. The "zero" state is considered as the initial magnetic state of the element 10 for the purpose of explaining this invention. The flux patterns defining the "zero" state is such that the magnetic element 10 is magnetized toroidally around aperture 12; that is, a closed flux path is formed by flux linking leg $1^a$ and leg 3 and a second closed path linking leg $1^b$ and leg 2. The "one" state is assumed by the magnetic element 10 when the input winding 16 is provided with a current for producing a coercing field, H, in leg 2 acting in a counter-clockwise direction or to reverse the direction of flux in leg 2 from that of the "zero" state. Upon the application and termination of such an energizing current to the winding 16, the flux around aperture 12 linking leg $1^b$ and leg 2 will be reversed, that is, will travel counter-clockwise. The flux linking through leg $1^a$ and leg 3 is left in its original clockwise orientation.

The "prime" state is effected by energizing prime winding 18 to produce a coercive force in leg 3 to reverse the direction of the flux in legs 2 and 3. The reversal of the flux in legs 2 and 3 is considered to cause the flux in these two legs to close toroidally about aperture 14. The flux in legs $1^a$ and $1^b$ will at this same time assume a crescent-shaped configuration as shown in FIG. 3 in going from the "one" state of the "prime" state. It is considered that the crescent-shaped configuration is the only closed configuration consistent with the polarity of the coercing force and the magnitude of the "prime" current that was employed in the operation of the element 10. The magnetic element 10 will not assume the other configuration possible at this interval since it would require a high priming current to effect such a change. This possible configuration would saturate the element 10 in a counter-clockwise direction about aperture 12 or merely change the direction of flux through legs $1^a$ and 3.

Figure 4:
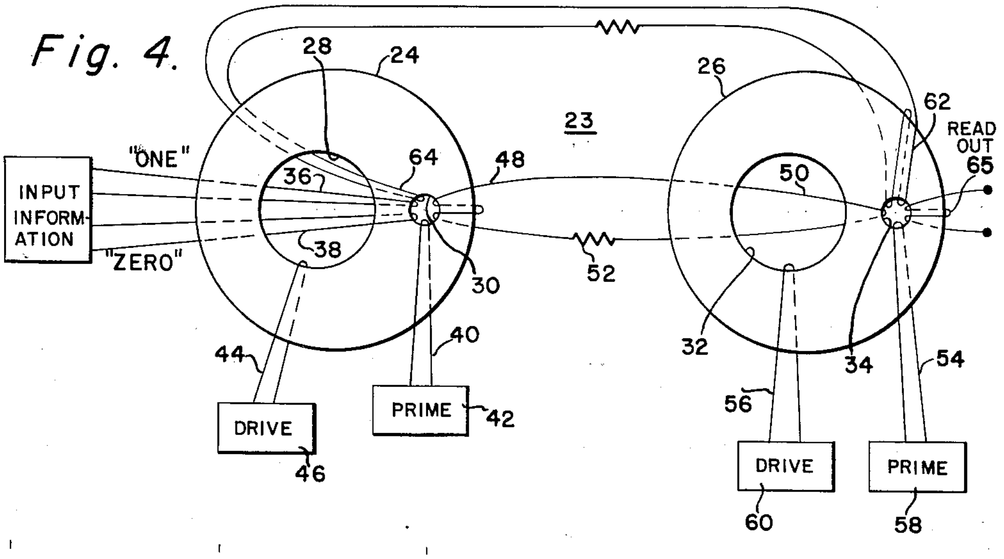
FIG. 4 is a schematic representation of a flip-flop circuit employing the novel magnetic element of FIG. 1.

Now referring to FIG. 4, a bistable circuit 22 employing the novel magnetic element 10 will be described with the aforementioned flux configurations in mind. The bistable circuit 23 employs a pair of the novel magnetic elements identified by the reference characters 24 and 26. The magnetic element 24 has an aperture 28 and an aperture 30 for receiving the windings interlaced to the element 24 while the corresponding apertures for the element 26 are identified as apertures 32 and 34. The magnetic elements 24 and 26 are arranged with the same windings as described hereinabove but in a novel manner to define an all magnetic, "dynamic" flip-flop circuit.

The term "dynamic" is used in the sense that a binary bit of information is continually shifted back and forth between the elements 24 and 26 and which binary bit may be changed in accordance with the input information delivered to the bistable circuit 23. The binary bit of information shifted between the elements 24 and 26 is continually read-out to thereby give an indication of the storage condition of the bistable circuit 23. The input information delivered to the bistable circuit 23, in this instance, is derived from the computer proper and delivered to a pair of input windings 36 and 38 coupled to the element 24. The windings 36 and 38 are further identified as the "one" and "zero" input windings, respectively, in accordance with conventional terminology.

The winding 36 is magnetically coupled to the element 24 by being interlaced through the aperture 30 to control the flux in leg 2. The input winding 38 is also interlaced through the aperture 30 to control the flux in leg 2 but is magnetically oriented with respect to the winding 36 so as to produce a coercive force in leg 2 acting in the opposite direction from that produced by the winding 36. A prime winding 40 is interlaced through aperture 30 to control leg 3 and is connected to a prime source 42, shown in block form. A drive winding 44 is also interlaced through aperture 28 to magnetically coerce legs $1^a$ and $1^b$ and is similarly energized through a drive source 46 also shown in blockform. The output signal from the magnetic element 24 is derived therefrom by means of the output winding 48 interlaced through aperture 32 so as to be linked by the flux changes in leg 3. The output winding 48 is connected in a series circuit relationship with an input winding 50 interlaced through the aperture 34 for magnetic element 26 to form a transfer circuit. The transfer circuit comprising windings 48 and 50 may include a series resistor 52 therein to reduce the time constant of the transfer circuit.

The input winding 50 for the element 26 is magnetically coupled thereto to control the flux in leg 2. The magnetic element 26 is also provided with a prime winding 54 interlaced through aperture 34 for controlling leg 3 and with a drive winding 56 interlaced through aperture 32 to control legs $1^a$ and $1^b$. The winding 54 is connected through a prime source 58 while the drive winding 56 is similarly connected to a drive source 60. An output winding 62 is magnetically arranged with the aperture 34 and leg 3 of the element 26 to provide an output signal from the element 26 and which output signal is transferred to the element 24 by means of a transfer loop including a winding 64 interlaced through the aperture 30 for controlling leg 2 of element 24. The relative orientation of winding 64 is the same as that for input winding 36, the "one" winding. Accordingly, it will be appreciated that the coercive forces produced by winding 64 and the "zero" winding 38 are in opposite directions. A read-out winding 65 is also interlaced through the aperture 34 to be responsive to the flux changes in leg 3 of element 26 and thereby provides the dynamic signal representative of the binary state of the bistable circuit 23.

Assuming that the elements 24 and 26 are both in the "zero" state, the operation of the bistable circuit 22 will be described. With both the elements 24 and 26 in this "zero" magnetic condition and the "one" input winding 36 energized, the element 24 will assume the "one" state shown in FIG. 3. Accordingly, upon a pulse being delivered from the priming source 42 to the prime winding 40 of element 24, the latter will now assume the "prime" condition, that is, the crescent shaped pattern will exist. After the magnetic element 24 assumes the "primed" state, the current from drive source 46 is applied to drive winding 44 to cause the element 24 to switch from the "prime" state back to the "zero" state and during which interval an output signal will be generated in the output winding 48. This output signal is representative of the binary bit of information that was previously delivered to the magnetic element 24 (the "one") by means of input winding 30. This same bit of binary information is transferred into the winding 50 for storage in magnetic element 26.

Figure 5:
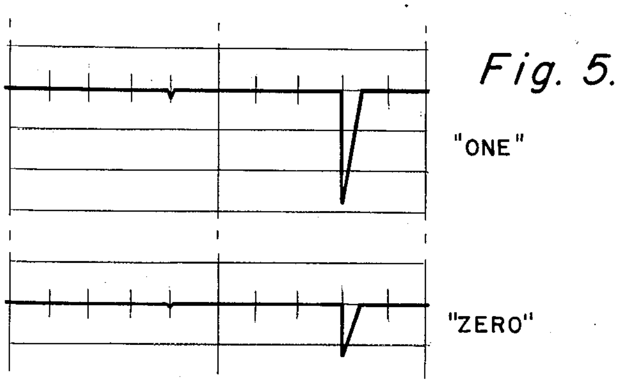
FIG. 5 is a graphic representation of typical wave forms derived from the flip-flop circuit of FIG. 4.

The sequencing for the magnetic element 26 is similar to that for the element 24, that is, first the prime winding 24 is energized followed by the energization of the drive winding 56. Following the energization of the drive winding 56 the "one" is transferred back into element 24 by means of the output winding 62 of the element 26 and the winding 64 of the element 24. Simultaneously with this transfer of binary bits between the elements 26 and 24, a voltage is generated in read-out winding 65, representative of the "one," substantially as shown in FIG. 5. This same bit of binary information will be transferred back and forth between these elements as long as neither input winding 36 or 38 is energized or a "one" is delivered to winding 36. If the input information delivered to the bistable circuit 23 calls for a change of this information, namely a "zero"; the "zero" input winding 38 will be energized. Accordingly, the timing of the transfer of the binary bit from the element 26 to the element 24 is arranged so that the input information coupled to the input winding 38 arrives at substantially the same time as the binary bit transferred to the winding 64. Since the windings 38 and 64 produce coercive forces in leg 2 in opposite directions, the bit from element 26 will not be stored in the element 24 and the latter element is left in its "zero" state. Therefore, upon the successive energization of the priming winding 40 and the drive winding 44, for the element 24 a "zero" signal will be delivered to element 26. The transfer of this "zero" signal into the element 26 will not effect its "zero" state. Upon the successive energization of priming winding 54 and drive winding 56, the "zero" will be once again stored in the element 24. At this same time the "zero" read-out signal substantially as shown in FIG. 5 may be derived from the read-out winding 65.

When a "zero" is read into the magnetic element 24, it will be recalled from the above discussion that the binary "one" transferred from magnetic element 26 to the magnetic element 24 is not written into the latter element and accordingly the magnetic element 24 remains in its "zero" state. When the magnetic element 24 is in its "zero" state and the prime winding 40 is energized the coercive force set up by the prime winding 40 attempts to reverse the direction of the flux in leg 3. In order to effect this reversal of flux in leg 3, the flux in leg $1^a$ must also be reversed and accordingly the magnetizing current delivered by the source 42 must be large enough to magnetize the element 24 about a path length comprised of the distance around legs $1^a$ and 3. Since this is not desired at this time, it will be appreciated by those skilled in the art that for proper flip-flop operation, this magnetizing current sets the upper limit for the "priming" ampere-turns. That is, the ampere-turns for priming the magnetic elements 24 and 26 must be large enough to effect a reversal about apertures 30 and 34 by means of legs 2 and 3 but not large enough to effect a reversal in legs $1^a$ and 3. It has been found that the ratio of these two limits may be varied by varying the diameter of apertures 28 and 32. It has been found also, that a large diameter for these apertures improves the ratio, i.e, it makes it larger, but increases the drive current required from the drive source 46.

It is an important feature of this invention that the normal back flow problem, i.e., transfer of information from right to left during a left-to-right transfer, that exists in conventional magnetic flip-flop circuits is solved by this invention without resorting to either a shunt or a series diode in the transfer circuit. The shunt diode has been eliminated in prior art circuits by proper adjustment of the turns ratio of the windings in the transfer loops between the magnetic elements. The novel magnetic element 10 employed herein allows this adjustment to be much less critical than in prior art devices. The number of turns required for output winding 48 is two while winding 50 is a single turn. This reduction in criticality should allow higher switching currents, in this instance denoted or termed "priming" currents, to be employed with this magnetic arrangement as compared to prior art circuits.

The elimination of the series diode in the transfer loop between magnetic elements is also obviated by this novel magnetic structure. It will be recalled by reviewing FIG. 2 that in the transition from the "one" state to the "prime" state the flux in leg 3 is reversed. This reversal of flux in leg 3 causes a voltage to be induced in the winding 26 so as to transfer information into magnetic element 24 by means of the winding 64 coupled thereto. However, this forward transfer of information is blocked and merely acts to drive leg 2 of magnetic element 24 further into saturation and accordingly has no effect on the state thereof.

Figure 6:
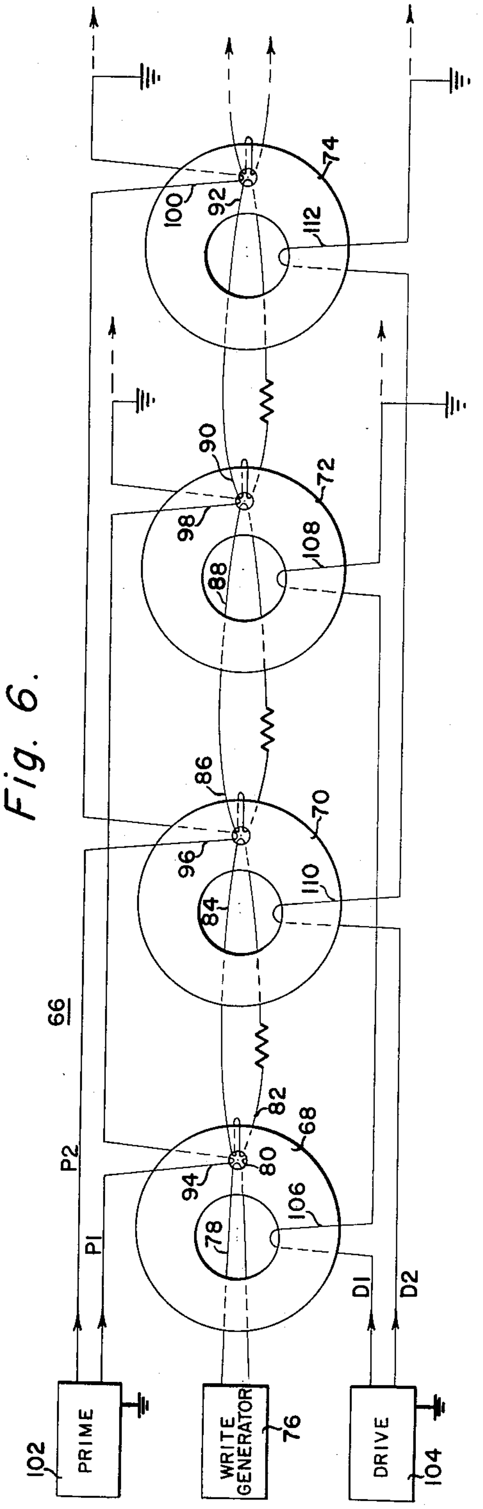
FIG. 6 is a schematic representation of a magnetic shift register arrangement employing the magnetic element of FIG. 1.

Now referring to FIG. 6, a shift register arrangement employing the shifting concept described in conjunction with the bistable circuit 23 will be described wherein two magnetic elements per bit are required.

The structural arrangement of the magnetic elements comprising the shift register 66 is substantially the same as that for the bistable circuit 23. The shift register 66 in this instance comprises a plurality of the multiple state magnetic elements arranged in cascade fashion and identified by the reference characters 68, 70, 72 and 74. The input information for the shift register 66 is provided by a write generator 76 connected to the input winding 78 for the magnetic element 68. The input winding 78 is coupled to aperture 80 for magnetic element 68 to control leg 2 thereof as described hereinabove. Similarly, the output winding 82 of the element 68 is coupled to the element 70 by means of its imput winding 84. The output winding 86 for element 70 is in turn connected to the input winding 88 for element 72 while the output winding 90 thereof is connected to the input winding 92 for the element 74. Each of these transfer circuits are shown in FIG. 6 as including a series resistor proportioned to reduce the time constants of the transfer circuits as previously mentioned. The "prime" windings for the elements 68 through 74 are connected up in groups of two as to activate the prime windings in series or in response to a two beat pattern. The prime windings for the elements 68 through 74 are identified by the reference characters 94, 96, 98 and 100, respectively. The prime windings 94 and 98 are connected in series circuit relationship with the "priming" source 102 for energization during the same interval while the windings 96 and 100 are also connected in series circuit relationship to be energized from the "prime" source 102 during a different interval. The drive windings for the magnetic elements 68 through 74 are also similarly arranged with a source 104 in groups of two. The winding 106 is connected in series circuit relationship with the winding 108 while the winding 110 is connected in series circuit relationship with the winding 112 to be energized at a different interval from the aforementioned drive windings.

*Table*

| Time | Leg | | | | Function |
|---|---|---|---|---|---|
| | $1^a$ | $1^b$ | 2 | 3 | |
| 0 | ↑ | ↑ | ↓ | ↓ | "Zero" state. |
| 1 | | | ↑ | | "Transfer In" coercive force (H). |
| 2 | ↑ | ↓ | ↑ | ↓ | "One" state. |
| 3 | | | | ↑ | Prime coercive force. |
| 4 | ↑ | ↓ | ↓ | ↑ | Primed state. |
| 5 | ↑ | ↑ | | | Drive coercive force. |
| (0) | ↑ | ↑ | ↓ | ↓ | "Zero" state. |

The sequence of operation of the magnetic shift register 66 will be described in conjunction with the above table. Assuming that all of the magnetic elements 68 through 74 are in the "zero" state initially or at time zero, at time *t*1 in accordance with the above table the writer generator 76 energizes the input winding 78 to produce a coercive force in leg 2 of the element 68 so as to establish the element in its "one" state. It will be recalled from the above description that the input winding 78 solely controls leg 2 and accordingly no change in flux occurs in leg 3 and correspondingly no signal is transferred into the element 70. During the next time interval, namely, *t*3, the paired prime windings for the cores 68 and 72 are energized from the source 102. Since the magnetic element 68 is the only element that is in the "one" state, it will be the only element to respond to assume the "prime" state at time *t*4. At time *t*5, the drive windings for the cores 68 and 72 are energized together to produce the coercive forces shown in the above table. Following the energization of the drive windings 106 and 108, the binary "one" that was stored in the magnetic element 68 will be found stored in the element 70. It will be seen that time *t*5 for the element 68 corresponds to time *t*1 for the succeeding element, the element 70. At this time the alternate cycle of pulsing begins to pulse the second pair of elements 70 and 74 during time intervals *t*6 through *t*10 which will correspond respectively with the function set out for *t*1–*t*5.

In the second cycle of operation, at time *t*7 (*t*3) the magnetic shift register 66 will store the binary information 0100 reading from left to right. At time *t*7 (*t*3) in this cycle the "prime" windings 96 and 100 are energized to place the element 70 in its prime state. The magnetic pattern then will read 0-Prime-00. Similarly, at time *t*8 (*t*4) the drive windings 110 and 112 are energized and following which energization the binary "one" bit is transferred from element 70 to element 72 and the cycle will now once again repeat with the binary bits being transferred to the element 68 to the element 70 and from the element 72 to the element 74, respectively, in response to the pulsing pattern from the sources 102 and 104. It will be appreciated that during the time intervals that information is being transferred from the elements 70 and 74 that the write generator 76 may also be energized to write in information into the element 68.

Although the novel magnetic shift register 66 has been described as a two element register, it will be readily appreciated that the register 66 may be modified to provide a one element per bit register. This modification is effected by providing a temporary storage device or delay element in the transfer circuits between the magnetic elements. For example, a temporary storage device may be connected in series circuit relationship with the winding 82 and the winding 84 and which storage device should have sufficient storage time to allow the succeeding element, in this instance element 70, to respond to the energization of the drive winding prior to the arrival of the information transferred from the element 68.

Now referring to FIG. 7, a modified magnetic element will be described wherein a bucking winding 115 is incorporated into the structure making higher switching speeds possible. The bucking winding 115 is essentially a modification of the prime winding 18 shown in FIG. 1 so as to include a portion 115ᵃ to magnetically couple legs 1ᵃ and 1ᵇ along with the portion 115ᵇ controlling leg 3. More specifically, the winding 115 is wound with the portion 115ᵃ around legs 1ᵃ and 1ᵇ and the portion 115ᵇ interlaced through the aperture 14' so as to control the leg 3 in the aforementioned manner. The provision of a buckling winding on the magnetic element 10 allows for the usage of higher priming currents to thereby effect shorter priming time while still avoiding the reversal of flux in legs 1ᵃ and 1ᵇ during this interval. The remaining windings, namely the input winding 16, the drive winding 22, and the transfer-out winding 20 remain the same as described for the basic magnetic element 10.

The function of the bucking winding 115 is such that when the element 10 is in its "zero" state the winding 115 will oppose the reversal of flux through legs 1ᵃ and 1ᵇ to thereby make overpriming to the spurious "one" condition more difficult. When a "one" is stored in the element 10 and the prime winding 115 is energized the coercive force set up in leg 1ᵇ is such as to tend to switch the direction of the flux therein. However, during this same interval the coercive force due to winding portion 115ᵇ on leg 3 is also attempting to effect a reversal in leg 2 and which reversal should occur prior to any reversal in the leg 1ᵇ. The relative switching times of these legs will be evident from a consideration of the flux paths for switching legs 1ᵇ and 2, the latter being the much shorter path and should require less time. Therefore, upon the switching of the flux in leg 2, no closure path for leg 1ᵇ to reverse on will remain, and so leg 1ᵇ will be maintained in its original condition.

Figures 7, 8, 9:
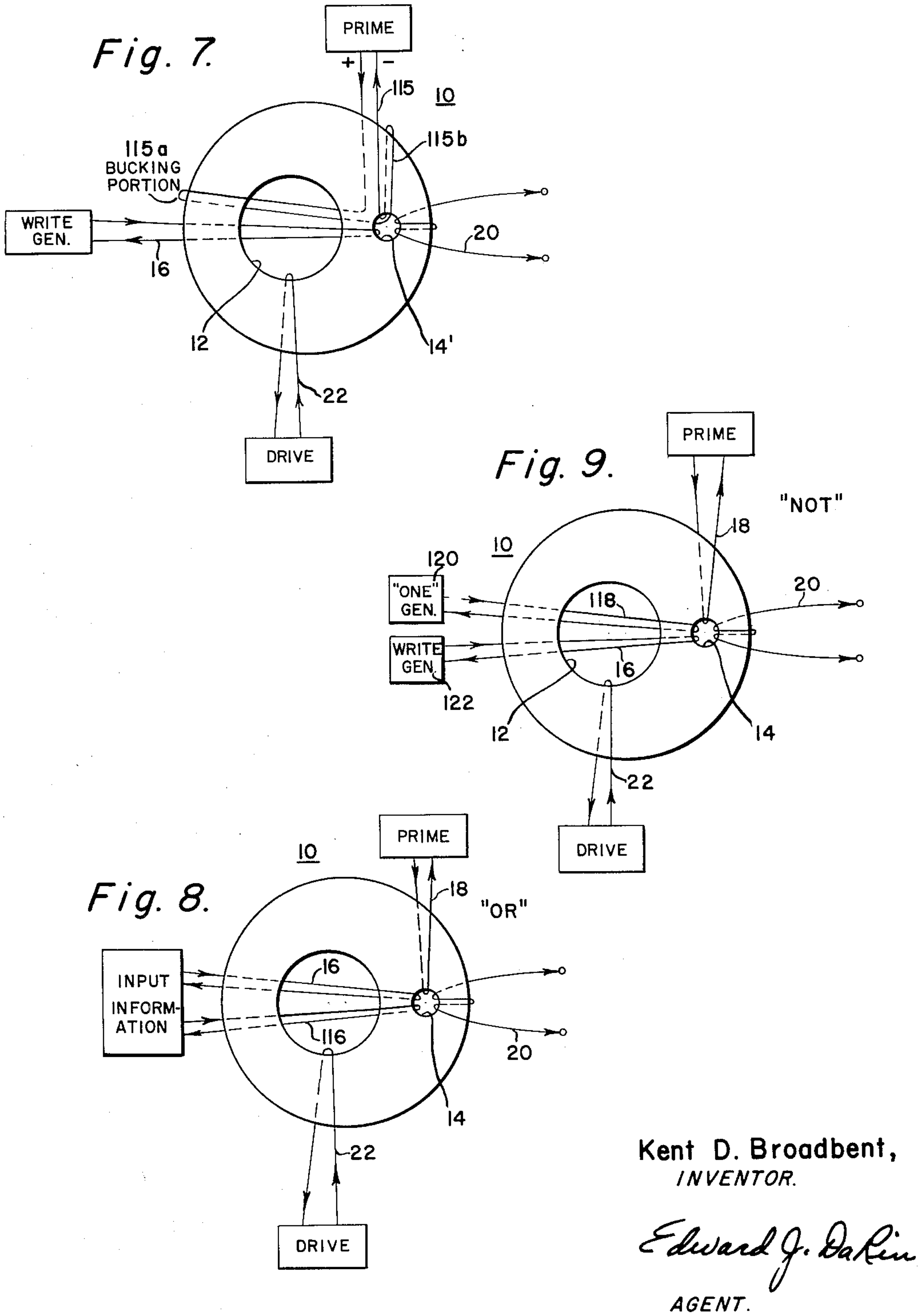
FIG. 7 is a schematic representation of a modified magnetic element.
FIG. 8 is a schematic representation of a logical "or" circuit arrangement.
FIG. 9 is a schematic representation of a logical "not" circuit.

The magnetic element 10 may also be modified for "logical" gating operations as exemplified by the logical "or" circuit shown in FIG. 8 and the logical "not" circuit of FIG. 9. The consideration of the logical "or" circuit of FIG. 8 is generally similar to the basic magnetic element 10 of FIG. 1. To modify the element 10 for providing logical "or" operation, it is only necessary to provide additional input windings interlaced through the aperture 14 for the element 10. Merely for the purposes of clarity in illustrating the invention, only a pair of input windings 16 and 116 are shown in FIG. 8, it being understood any number may be added thereto consistent with physical structure employed.

The general operation of the logical "or" circuit is such that an input signal applied to either of the input windings 16 and 116 will set the element 10 into its "one" state. Upon setting the element into its "one" state the successive energization of prime winding 18 and drive winding 22 will be effective to gate or transfer out an output signal representative of the "one" signal in the output winding 20.

A consideration of the logical "not" circuit of FIG. 9 will now be made. The basic magnetic element 10 is modified by the inclusion of an extra input winding identified by the reference character 118 to provide "not" logic. "Not" logic is employed herein in the conventional sense, that is when an input signal representative of a binary "one" is delivered to a "logical" element, the hignal read out from this same element is the normal binary "zero."

This may also be expressed as a "not-one" signal. Similarly, when a binary "zero" input signal is delivered to a logical element, the output signal is a "not-zero" signal or a "one" output signal.

The input winding 118 is interlaced through the aperture 14 and magnetically oriented thereon to control the flux in leg 2 but in opposition and equal to the normal coercive force of input winding 16. The additional input winding 118 is connected to a "one" generator 120. The output of the "one" generator is adapted to provide an exciting current to the winding 118 to write in a "one" in the element 10 in the same fashion as the write generator 122 provided for the input winding 16 and substantially simultaneously with the energization of the input winding 16. The resulting "not" logic from this arrangement should now be evident in view of the fact that the sequencing of the magnetic element 10 is not changed for this "not" circuit. With the delivery of a binary "one" from both generators 120 and 122 to their respective windings, the coercive forces in leg 2 tend to cancel one another and leave the element 10 in its original state. When the write generator 122 delivers a "zero" signal, the "one" signal delivered by the generator 120 at this time is written into the element 10. Therefore, upon the successive energization of the prime winding 18 and the drive winding 22, a "one" signal is read-out of the output winding 20. The "one" output signal is the complement of the "zero" input signal or a "not-one" signal.

It will now be appreciated that a novel and improved multi-apertured magnetic device capable of use as a control and computing element has been disclosed. The novel magnetic element disclosed is capable of assuming multiple stable states allowing it to perform functions not previously possible with multipath magnetic elements, such as shift register operation. The shift register arrangement does away with unilateral devices and the like while allowing one way flow of information. The elimination of diodes, and the low number of turns results in cheaper constructed units and superior environmental characteristics.

What is claimed is:

1. A magnetic element comprising a magnetic core characterized by a substantially square hysteresis loop and having a predetermined stable initial flux pattern established therein, said core having first and second spaced apart apertures of substantially different dimensions arranged on the core to define at least a pair of flux paths about each of said apertures of substantially different length, an input winding magnetically coupled to said core through said smaller aperture for controlling the direction of the flux passing adjacent the larger aperture to thereby change the initial flux pattern, a prime winding having a first portion magnetically coupled to said core through said smaller aperture for changing the direction of the flux passing about the larger aperture only upon a change in flux direction produced by the previous energization of said input winding, said prime winding having a second portion coupled to said larger aperture in a preselected magnetic sense, an output winding magnetically coupled to said smaller aperture, and a drive winding magnetically coupled to said core through said larger aperture for switching said core to said initial flux pattern to thereby produce an output signal in said output winding in response to a change produced by said input winding.

2. A magnetic device comprising a plurality of magnetic storage elements each having a core characterized by a substantially square hysteresis loop and having an initial stable flux pattern established therein, each of said cores having first and second spaced apart apertures of substantially different dimensions arranged on said cores to define at least a pair of flux paths about each of said apertures of substantially different length, an input winding coupled to said core through said smaller aperture of each of said elements for controlling the direction of the flux passing adjacent to the larger aperture to thereby change the initial flux pattern, means for delivering binary-coded signals to a first of said elements, prime windings coupled to said core through said smaller apertures of each of said elements for changing the direction of the flux passing on either side of the small aperture only upon a change in flux direction produced by the previous energization of said input winding, means for alternately delivering priming signals to predetermined ones of said priming windings, drive windings coupled to said core through said larger aperture for switching said cores to said initial pattern, an output winding coupled to said core through said smaller aperture of each of said elements, circuit means coupling said output winding to a successive input winding, and means for alternately delivering drive signals to predetermined ones of said elements in a timed relationship with the delivery of said priming signals.

3. A magnetic device comprising first and second magnetic storage elements capable of assuming at least first, second and third stable states, each of said elements having first and second spaced apart apertures of substantially different dimensions arranged thereon to define at least a pair of flux paths about each of said apertures of substantially different lengths, an input winding coupled to said first element through said smaller aperture for controlling only the direction of the flux passing between said apertures, means for delivering binary-coded input signals to the input winding of the first magnetic element, an output winding magnetically coupled to said elements through the smaller aperture of each of said elements, circuit means coupling said output winding of said first element with said input winding of said second element, prime windings coupled to said elements through said smaller aperture of each of said elements for controlling the configuration of said flux paths only upon a change produced by said corresponding input winding, means for alternately delivering priming signals to said prime windings for each of said elements, drive windings coupled to said elements of said larger aperture of each of said elements for switching same to said initial stable state and means for alternately delivering drive signals to said drive windings in a timed relationship with the delivery of said priming signals.

4. A magnetic device as defined in claim 3 wherein each of said prime windings further includes a winding portion coupled through said larger aperture in a predetermined magnetic sense.

References Cited in the file of this patent

UNITED STATES PATENTS

| | | |
|---|---|---|
| 2,792,564 | Ramey et al. | May 14, 1957 |
| 2,802,202 | Lanning | Aug. 6, 1957 |
| 2,803,812 | Rajchman et al. | Aug. 20, 1957 |
| 2,810,901 | Crane | Oct. 22, 1957 |
| 2,911,628 | Briggs et al. | Nov. 3, 1959 |